Patented May 21, 1940

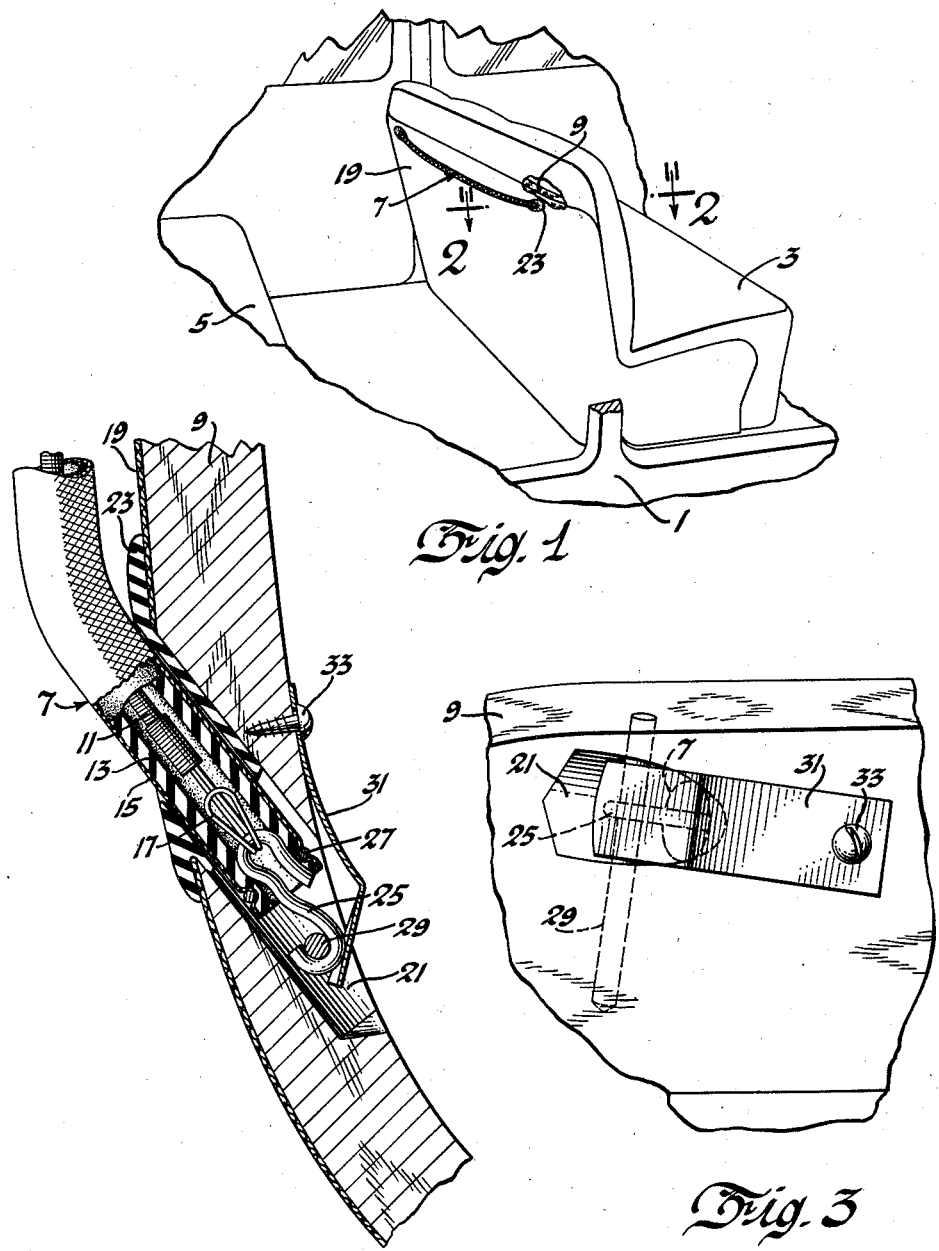

2,201,327

UNITED STATES PATENT OFFICE 2,201,327

ROBE RAIL MOUNTING

Guy L. Tucker, Detroit, Mich., assignor to General Motors Corporation, Detroit, Mich., a corporation of Delaware Application February 11, 1938, Serial No. 189,910

2 Claims. (Cl. 105—354)

This invention relates to robe rails such as are used on the backs of the front seats of motor vehicles.

An object of the invention is to provide an improved fastening means for the ends of such a robe rail.

More specifically the novel fastening means is intended to facilitate the assembly of the robe rail and to improve the appearance of the assembled rail.

Other objects and advantages will be understood from the following description.

On the drawing:

Figure 1 is a view in perspective showing the robe rail in position.

Figure 2 is a section on line 2—2 of Figure 1.

Figure 3 is a view in elevation as seen from the forward side of the back of the front seat.

Numeral 1 represents the body of a vehicle having a front seat 3 and a rear seat 5. A robe rail 7 is carried by the back portion 9 of the front seat. The robe rail is not new and does not per se constitute the subject of this application. It is formed by a flexible and resilient core 11 within a tubular container 13 which may be of rubber or the like, the latter being surrounded by a sheath 15 of suitable upholstery. At each end of the core 11 is a hook 17. In some prior installations brackets have been secured to the end parts of the rear face 19 of the seat back. To these brackets hooks 17 or their equivalents have been attached.

In accordance with the present invention an opening 21 is formed within the back 9 which opening extends from the front face to the rear face thereof. Any suitable member 23 may be used to cover the edge of the opening where it joins the rear face 19. This member 23 may also extend a little way into the opening as shown by Figure 2 and it constitutes a tubular member within which projects the end of the rail. In accordance with my invention the housing 13 with its sheath 15 extends beyond the end of the hook 17 as shown in Figure 2. Extending preferably vertically and transversely across the opening 21 is an anchoring pin 29. To engage this pin and thus hold the end of the rail in position there is provided a fastener 25 substantially in the form of a letter S. One end of this fastener is engaged by the hook 17 which is within the end of the housing 13. At the extreme end of housing 13 an external ring 27 is contracted about the tubular housing and thus substantially fixes the fastener 25 relative to the end of the flexible housing for the cable 11. In assembly, the end of the rail is passed through the opening on the rear face of the back of the seat, the fastener 25 being positioned at right angles to the position shown by Figure 2. After being pushed inwardly until the fastener is beyond the pin 29 the assembly is rotated through 90° so that the free end loop of the fastener may embrace the pin 29. To prevent possible escape of the fastener from the pin a spring plate 31 is secured by a screw 33 to the front face of the back of the seat. The plate yieldingly holds the fastener on the pin as will be understood from an inspection of Figure 2. The plate 31 yields against manually applied pressure when the fastener is being pushed through the opening 21 and it resiliently holds the parts in position when the fastener is engaged with the pin.

It will be obvious that the cover plate 23 may be of any material, shape or color to harmonize with the interior finish of the car.

I claim:

1. In combination with a robe rail and a seat back, said seat back having an opening therein and a pin traversing said opening, said robe rail having a terminal fastener with an end loop to engage said anchor pin within said opening, together with means secured to said seat back and yieldably engaging said fastener to permit assembly and to prevent the escape of said fastener from said anchor pin.

2. In combination with a robe rail and a seat back, said seat back having an opening therein, said robe rail having a terminal fastener including an end loop, anchoring means fixedly mounted adjacent said opening and adapted to be engaged by said loop together with means secured to said seat back and yieldably engaging said fastener.

GUY L. TUCKER.